United States Patent
Arai et al.

(10) Patent No.: US 6,901,790 B2
(45) Date of Patent: Jun. 7, 2005

(54) INTERNAL COMBUSTION ENGINE INDUCTION AIR VOLUME CALCULATING APPARATUS

(75) Inventors: Minoru Arai, Saitama (JP); Atsushi Ishii, Saitama (JP); Koichi Yoshiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,002

(22) Filed: Sep. 5, 2003

(65) Prior Publication Data

US 2004/0045346 A1 Mar. 11, 2004

(30) Foreign Application Priority Data

Sep. 6, 2002 (JP) .................................... P. 2002-262010

(51) Int. Cl.[7] ............................................. G01M 15/00
(52) U.S. Cl. ..................................................... 73/118.2
(58) Field of Search ............................... 73/116, 117.2, 73/117.3, 118.1, 118.2; 701/29, 101

(56) References Cited

U.S. PATENT DOCUMENTS 6,561,016 B1 * 5/2003 Suhre et al. ................ 73/118.2
2004/0111211 A1 * 6/2004 Takizawa et al. ........... 701/114

FOREIGN PATENT DOCUMENTS

JP 3-48340 7/1991

* cited by examiner

Primary Examiner—Eric S. McCall
(74) Attorney, Agent, or Firm—Arent Fox

(57) ABSTRACT

A deviation DGAIR between a first induction air volume GAIRTH that is calculated (S10) based on a detected value (Gair) of an air flow meter and a second induction air volume GAIRPB that is calculated (S12) based on an absolute pressure (PBA) is calculated (S14), and a mean value DGAIRAVE of the deviation DGAIR is calculated (S16, S18), whereby when a difference DDGAIR between the deviation DGAIR and the mean value DGAIRAVE is larger than a predetermined value DGAIL1 (or when a correction mode AFMMODE is 1), secondary air is determined to be supplied to an engine, and the first induction air volume GAIRTH is then corrected (S24, S26).

27 Claims, 3 Drawing Sheets

INTERNAL COMBUSTION ENGINE INDUCTION AIR VOLUME CALCULATING APPARATUS

BACKGROUND OF THE INVENTION

The present invention relates to an internal combustion engine induction air volume calculating apparatus.

It is a conventional practice to detect the volume of induction air that passes a throttle valve with an air flow meter so as to determine a fuel injection volume according to the detected induction air volume.

However, when a secondary air is supplied to the air induction pipe at a portion downstream (an internal combustion engine side) of the air flow meter by, for example, a brake booster (a vacuum servo unit), a larger volume of air than the induction air volume detected by the air flow meter or the volume of induction air that passes the throttle valve is supplied to the internal combustion engine. Due to this, air-fuel mixture becomes lean and, in particular, when the engine is idling, there is caused a drawback that the idle speed of the internal combustion engine is lowered.

To cope with this, for example, there is proposed an idea of providing a brake switch for outputting a signal corresponding to the operation of the brake booster, so that a correction control is carried out to prevent a decrease in engine rotational speed when it is detected that the brake is released or the secondary air is supplied from the brake booster (refer to, for example, Patent Literature No. 1).
[Patent Literature No. 1]
The Examined Japanese Patent Application Publication No. Hei3-48340 (from page 3 to page 4)

In the related art, however, while whether or not the secondary air is supplied from the brake booster can be detected, an increase in induction air that is supplied to the internal combustion engine cannot be detected. Therefore, the correction control has been unable to be implemented with good accuracy. In addition, there has been a drawback that, in the event that the brake switch fails, the implementation of the correction control becomes impossible.

Note that the drawbacks are associated not only with the secondary air supplied from the brake booster but also with secondary air supplied from, for example, an EGR unit (an exhaust gas recirculation unit), a purge mechanism, or a PCV unit (a blow-by gas recirculation unit) to the air induction pipe at a position downstream of the air flow meter.

SUMMARY OF THE INVENTION

Consequently, an object of the invention is to provide an internal combustion engine induction air volume calculating apparatus which can obviate the necessity for switches for detecting whether or not secondary air is supplied and which can detect with good accuracy the volume of secondary air that cannot be detected by the air flow meter to thereby make it possible to calculate with good accuracy the volume of induction air that is supplied to the internal combustion engine.

With a view to attaining the object, according to a first aspect of the invention, there is provided an internal combustion engine induction air volume calculating apparatus for calculating the volume of induction air supplied to an internal combustion engine via an air induction pipe, the apparatus including an air flow meter for detecting the volume of induction air which passes a throttle valve disposed in the air induction pipe, an air induction pipe internal pressure sensor for detecting the internal pressure of the air induction pipe, a determination unit for determining whether or not induction air other than the induction air volume so detected is supplied to the internal combustion engine based on the detected induction air volume and air induction pipe internal pressure, and a correction unit for correcting the detected induction air volume when it is determined that induction air other than the induction air volume so detected is supplied to the internal combustion engine.

The volume of induction air that passes the throttle valve is detected by the air flow meter, and the internal pressure of the air induction pipe is detected by the air induction pipe internal pressure sensor. Based on the induction air volume and air induction pipe internal pressure which were so detected, whether or not induction air other than the induction air volume (the volume of induction air that passes the throttle valve) detected by the air flow meter or secondary air is supplied to the internal combustion engine is determined, and when it is determined that there exists secondary air that is supplied to the internal combustion engine, then the induction air volume detected by the air flow meter is designed to be corrected. According to the construction, the secondary air that cannot be detected by the air flow meter can be detected accurately, whereby the volume of induction air that is supplied to the internal combustion engine can be calculated with good accuracy. In addition, since the volume of induction air supplied to the internal combustion engine is calculated based on values detected by the air flow meter and the air induction pipe internal pressure sensor, the necessity for switches for sensing the existence of supplied secondary air can be obviated.

Further, there is provided an internal combustion engine induction air volume calculating method for calculating the volume of induction air supplied to an internal combustion engine via an air induction pipe, the method including the steps of detecting the volume of induction air which passes a throttle valve disposed in the air induction pipe, detecting the internal pressure of the air induction pipe, determining whether or not induction air other than the induction air volume so detected is supplied to the internal combustion engine based on the detected induction air volume and air induction pipe internal pressure, and correcting the detected induction air volume when it is determined that induction air other than the induction air volume so detected is supplied to the internal combustion engine.

Still further, there is provided a medium including a program for executing an internal combustion engine induction air volume calculating method for calculating the volume of induction air supplied to an internal combustion engine via an air induction pipe, the method including the steps of detecting the volume of induction air which passes a throttle valve disposed in the air induction pipe, detecting the internal pressure of the air induction pipe, determining whether or not induction air other than the induction air volume so detected is supplied to the internal combustion engine based on the detected induction air volume and air induction pipe internal pressure, and correcting the detected induction air volume when it is determined that induction air other than the induction air volume so detected is supplied to the internal combustion engine.

In addition, according to a second aspect of the invention, the correction unit calculates a correction volume for correcting the detected induction air volume based on the detected induction air volume and air induction pipe internal pressure.

Since a correction volume for correcting the induction air volume that was detected by the air flow meter is calculated based on the detected induction air volume and air induction pipe internal pressure, the volume of induction air supplied to the internal combustion engine can be calculated more accurately and quickly.

Further, there is provided the internal combustion engine induction air volume calculating method, wherein the correction step calculates a correction volume for correcting the detected induction air volume based on the detected induction air volume and air induction pipe internal pressure.

Still further, there is provided the medium, wherein the correction step calculates a correction volume for correcting the detected induction air volume based on the detected induction air volume and air induction pipe internal pressure.

Additionally, according to a third aspect of the invention, the determination unit determines whether or not induction air other than the detected induction air volume is supplied to the internal combustion engine at least either when the running condition of the internal combustion engine varies little or when the internal combustion engine is idling.

Since whether or not secondary air is supplied to the internal combustion engine is determined at least either when the running condition of the internal combustion engine varies little or when the internal combustion engine is idling, or in running conditions of the internal combustion engine other than the transitional running condition thereof where the effect of fluctuations in induction air volume attributed to secondary air becomes remarkable, fluctuations in air-fuel ratios and engine speed can be suppressed effectively. Note that since an erroneous determination on the existence of secondary air supplied to the internal combustion engine is easily made and the effect of fluctuations in induction air volume attributed to secondary air does not become remarkable in the transitional running condition of the internal combustion engine where there occur large fluctuations in induction air volume, neither determination nor correction is designed to be made in the transitional running condition.

Further, there is provided the internal combustion engine induction air volume calculating method, wherein the determination step determines whether or not induction air other than the detected induction air volume is supplied to the internal combustion engine at least either when the running condition of the internal combustion engine varies little or when the internal combustion engine is idling.

Still further, there is provided the medium, wherein the determination step determines whether or not induction air other than the detected induction air volume is supplied to the internal combustion engine at least either when the running condition of the internal combustion engine varies little or when the internal combustion engine is idling.

According to a fourth aspect of the invention, there is provided an internal combustion engine induction air volume calculator for calculating the volume of induction air supplied to an internal combustion engine via an air induction pipe, including an air flow meter for detecting the volume of induction air which passes a throttle valve disposed in the air induction pipe, a first induction air volume calculator for calculating a first induction air volume which is supplied to the internal combustion engine based on the induction air volume so detected, an air induction pipe internal pressure sensor for detecting the internal pressure of the air induction pipe, a second induction air volume calculator for calculating a second induction air volume which is supplied to the internal combustion engine based on the air induction pipe internal pressure so detected, a deviation calculator for calculating a deviation between the detected first induction air volume and second induction air volume, a determination unit for determining whether or not induction air other than the first induction air volume is supplied to the internal combustion engine based on the deviation so calculated, and a correction unit for correcting the first induction air volume when it is determined that induction air other than the first induction air volume is supplied to the internal combustion engine.

A deviation between the first induction air volume (the volume of induction air that passes the throttle vale) which is calculated based on the detected value of the air flow meter and the second induction air volume which is calculated based on the detected value of the air induction pipe internal pressure sensor is calculated, and based on the calculated deviation, whether or not induction air other than the first induction air volume or secondary air is supplied to the internal combustion engine is determined. Then, when it is determined that there exists secondary air that is supplied to the internal combustion engine, the first induction air volume is designed to be corrected. Thus, according to the construction, the volume of secondary air that cannot be detected by the air flow meter can be detected accurately, whereby the volume of induction air supplied to the internal combustion engine can be calculated with good accuracy. In addition, since the volume of induction air supplied to the internal combustion engine is calculated based on values detected by the air flow meter and the air induction pipe internal pressure sensor, the necessity for switches for sensing the existence of supplied secondary air can be obviated.

Further, there is provided an internal combustion engine induction air volume calculating method for calculating the volume of induction air supplied to an internal combustion engine via an air induction pipe, the method including the steps of detecting the volume of induction air which passes a throttle valve disposed in the air induction pipe, calculating a first induction air volume which is supplied to the internal combustion engine based on the induction air volume so detected, detecting the internal pressure of the air induction pipe, calculating a second induction air volume which is supplied to the internal combustion engine based on the air induction pipe internal pressure so detected, calculating a deviation between the detected first induction air volume and second induction air volume, determining whether or not induction air other than the first induction air volume is supplied to the internal combustion engine based on the deviation so calculated, and correcting the first induction air volume when it is determined that induction air other than the first induction air volume is supplied to the internal combustion engine.

Still further, there is provided a medium including a program for executing an internal combustion engine induction air volume calculating method for calculating the volume of induction air supplied to an internal combustion engine via an air induction pipe, the method including detecting the volume of induction air which passes a throttle valve disposed in the air induction pipe, calculating a first induction air volume which is supplied to the internal combustion engine based on the induction air volume so detected, detecting the internal pressure of the air induction pipe, calculating a second induction air volume which is supplied to the internal combustion engine based on the air induction pipe internal pressure so detected, calculating a deviation between the detected first induction air volume and second induction air volume, determining whether or not induction air other than the first induction air volume is supplied to the internal combustion engine based on the deviation so calculated, and correcting the first induction air volume when it is determined that induction air other than the first induction air volume is supplied to the internal combustion engine.

In addition, according to a fifth aspect of the invention, the correction unit calculates a correction volume for correcting the first induction air volume based on the deviation.

Since a correction volume for correcting the first induction air volume is calculated based on a deviation between the first induction air volume and the second induction air volume, the volume of induction air supplied to the internal combustion air can be calculated with better accuracy.

Further, there is provided the internal combustion engine induction air volume calculator, wherein the correction step calculates a correction volume for correcting the first induction air volume based on the deviation.

Still further, there is provided the medium, wherein the correction step calculates a correction volume for correcting the first induction air volume based on the deviation.

Furthermore, according to a sixth aspect of the invention, the internal combustion engine induction air volume calculating apparatus further includes a mean value calculator for calculating a mean value of the deviation, and a difference calculator for calculating a difference between the deviation and the mean value so calculated, wherein the determination unit determines whether or not induction air other than the first induction air volume is supplied to the internal combustion engine based on the difference so calculated.

Since whether or not secondary air is supplied to the internal combustion engine is determined based on a difference between the deviation between the first induction air volume and the second induction air volume and the mean value, the existence of supplied secondary air can be determined with better accuracy.

Further, there is provided the internal combustion engine induction air volume calculating method, further including the steps of calculating a mean value of the deviation, and calculating a difference between the deviation and the mean value so calculated, wherein the determination step determines whether or not induction air other than the first induction air volume is supplied to the internal combustion engine based on the difference so calculated.

Still further, there is provided the medium, further including the steps of calculating a mean value of the deviation, and calculating a difference between the deviation and the mean value so calculated, wherein the determination step determines whether or not induction air other than the first induction air volume is supplied to the internal combustion engine based on the difference so calculated.

In addition, according to a seventh aspect of the invention, the mean value calculator calculates the mean value at least either when the running condition of the internal combustion engine varies little or when the internal combustion engine is idling.

Since the mean value is calculated at least either when the running condition of the internal combustion engine varies little or when the internal combustion engine is idling, or in running conditions of the internal combustion engine other than the transitional running condition thereof where there occur large fluctuations in induction air volume, the mean value used for determination of the existence of secondary air can be calculated properly, thereby making it possible to determine the existence of supplied secondary air with better accuracy.

Further, there is provided the internal combustion engine induction air volume calculating method, wherein the mean value calculating step calculates the mean value at least either when the running condition of the internal combustion engine varies little or when the internal combustion engine is idling.

Still further, the medium, wherein the mean value calculating step calculates the mean value at least either when the running condition of the internal combustion engine varies little or when the internal combustion engine is idling.

Additionally, according to an eighth aspect of the invention, the correction unit calculates a correction volume for correcting the first induction air volume based on the difference.

Since a correction volume for correcting the first induction air volume is calculated based on the difference between the deviation between the first induction air volume and the second induction air volume and the mean value thereof, the volume of induction air supplied to the internal combustion engine can be calculated with better accuracy.

Further, there is provided the internal combustion engine induction air volume calculating method, wherein the correction step calculates a correction volume for correcting the first induction air volume based on the difference.

Still further, there is provided the medium, wherein the correction step calculates a correction volume for correcting the first induction air volume based on the difference.

In addition, according to a ninth aspect of the invention, the determination unit determines whether or not induction air other than the first induction air volume is supplied to the internal combustion engine at least either when the running condition of the internal combustion engine varies little or when the internal combustion engine is idling.

Since whether or not secondary air is supplied to the internal combustion engine is determined at least either when the running condition of the internal combustion engine varies little or when the internal combustion engine is idling, or in running conditions of the internal combustion engine other than the transitional running condition thereof where the effect of fluctuations in induction air volume attributed to secondary air becomes remarkable, fluctuations in air-fuel ratios and engine speed can be suppressed effectively. Note that since an erroneous determination on the existence of secondary air supplied to the internal combustion engine is easily made and the effect of fluctuations in induction air volume attributed to secondary air does not become remarkable in the transitional running condition of the internal combustion engine where there occur large fluctuations in induction air volume, neither determination nor correction is designed to be made in the transitional running condition.

Further, there is provided the internal combustion engine induction air volume calculating method, wherein the determination step determines whether or not induction air other than the first induction air volume is supplied to the internal combustion engine at least either when the running condition of the internal combustion engine varies little or when the internal combustion engine is idling.

Still further, there is provided the medium, wherein the determination step determines whether or not induction air other than the first induction air volume is supplied to the internal combustion engine at least either when the running condition of the internal combustion engine varies little or when the internal combustion engine is idling.

DETAILED DESCRIPTION OF THE PREFERRED EMBODIMENTS

Referring to the accompanying drawings, an internal combustion engine induction air volume calculating apparatus according to an embodiment of the invention will be described below.

Figure 1:
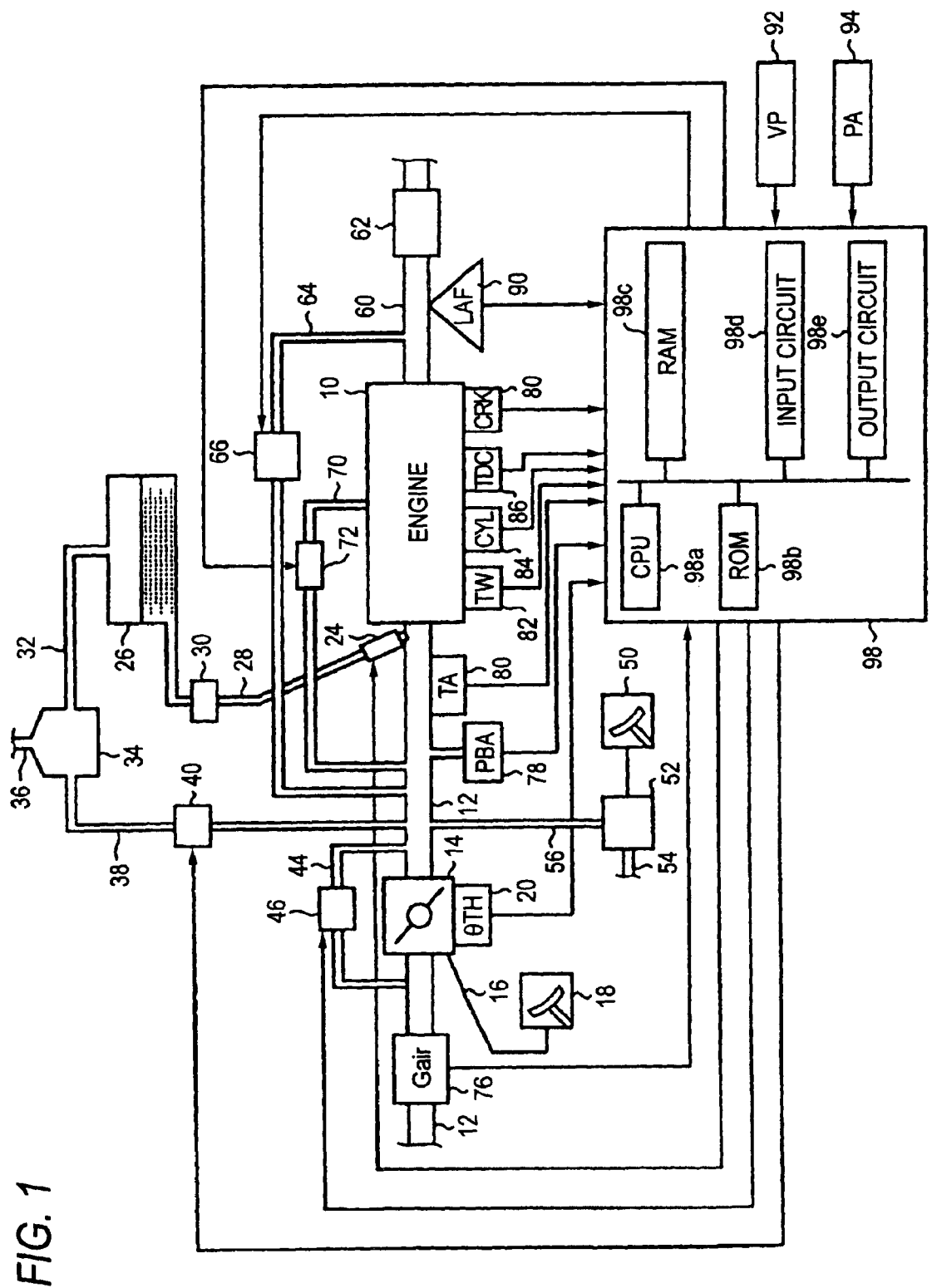
FIG. 1 is a schematic diagram showing the overall configuration of an internal combustion engine induction air volume calculating apparatus according to an embodiment of the invention.

FIG. 1 is a schematic diagram showing the overall configuration of an internal combustion engine induction air volume calculating apparatus according an embodiment of the invention.

In the figure, reference numeral 10 denotes an internal combustion engine (hereinafter, referred to as an "engine"). The engine 10 is, for example, a in-line four-cylinder DOHC engine.

A throttle valve 14 is disposed in an air induction pipe 12. The throttle valve 14 is mechanically connected to an accelerator pedal 18 provided on the driver's side floor of a vehicle (a vehicle on which the engine 10 is installed and which is not shown) via a throttle wire 16 and is opened or closed according to the depressed or released amount of the accelerator pedal 18 to thereby regulate the volume of induction air to the engine 10. A throttle position sensor 20 is provided in the vicinity of the throttle valve 14 to output a signal according to the opening θTH of the throttle valve 14 (hereinafter, referred to as a "throttle opening").

An injector (a fuel injection valve) 24 is provided for each cylinder (not shown) in the vicinity of an induction port immediately downward of an induction manifold (not shown), which is, in turn, downward of the throttle valve 14. The injector 24 is connected to a fuel tank 26 via a fuel supply pipe 28 and a fuel pump 30 and receives gasoline fuel sent thereto under pressure to inject the gasoline fuel so received into the induction port.

The fuel tank 26 is connected to a canister 34 via a fuel vapor line or charge passage 32. The canister 34 incorporates therein activated charcoal which adsorbs evaporative fuel and has an atmosphere communication pipe 36 (only part thereof is shown) which communicates with the atmosphere. In addition, the canister 34 is connected to the air induction pipe 12 at a position situated on a downstream side of the throttle valve 14 via a purge passage 38, so that evaporative fuel adsorbed to the canister 34 is purged to the air induction pipe 12 via a purge control valve 40 provided at a position along the length of the purge passage 38.

A by-pass passage (a secondary air passage) 44 is connected to the air induction pipe 12 in such a manner as to by-pass the throttle valve 14 so as to establish a communication between upstream and downstream sides of the throttle valve 14 in the air induction pipe 12. A by-pass control valve (EACV) 46 for controlling the volume of by-pass air is provided at an intermediate position along the length of the by-pass passage 44.

The by-pass control valve 46 is of a normally closed-type and has a valve for continuously changing the opening (the open area) of the by-pass passage 44, a spring for biasing the valve in a closed direction and an electromagnetic solenoid for moving the valve in an open direction against the biasing force of the spring when energized (none of the constituent devices is shown).

In addition, a brake pedal 50 is provided on the driver's side floor at a position adjacent to the accelerator pedal 18. The brake pedal 50 is mechanically connected to a brake booster (a vacuum servo unit) 52 which increases the depressing force applied to the brake pedal 50.

The brake booster 52 has two chambers, which are not shown, an atmosphere induction pipe 54 (only part of which is shown), a negative pressure induction pipe 56 which is connected to the air induction pipe 12 at a position on the downstream side of the throttle valve 14, and a control valve (not shown) for introducing either the atmospheric pressure or the negative pressure (the induction air pressure inside the air induction pipe) into the two chambers.

When the brake pedal 50 is not operated (or not depressed), a negative pressure is induced from the negative pressure induction pipe 56 into the two chambers. On the other hand, when the brake pedal 50 is depressed by the driver, the atmospheric pressure is induced into one of the chambers via the atmosphere induction pipe 54, whereby the depressing force of the brake pedal 50 is enhanced by virtue of a differential pressure occurring between the two chambers. When the brake pedal 50 is released from the depressed condition, the atmospheric pressure induced into the one of the chambers is caused to flow into the air induction pipe 12 via the negative pressure induction pipe 56.

The engine 10 is connected to an exhaust pipe 60 via an exhaust manifold (not shown), whereby exhaust gases produced from the combustion of air-fuel mixtures are discharged into the atmosphere from the exhaust pipe 60 while being purified by a catalytic converter (a three-way catalytic converter) 62 which is provided at an intermediate position along the length of the exhaust pipe 60.

The engine 10 has an EGR system (an exhaust gas recirculation system). The EGR system includes an EGR pipe 64 which connects the exhaust pipe 60 at a position upstream of the catalytic converter 62 and the air induction pipe 12 at a position downstream of the throttle valve 14 and an EGR control valve 66 which is provided at an intermediate position along the length of the EGR pipe 64, whereby unburned components in exhaust gases are recirculated to the air induction pipe 12 via the EGR pipe 64 when the EGR control valve 66 is opened.

In addition, the engine 10 has a PCV system (a blow-by gas recirculation system). The PCV system includes a PCV pipe 70 which connects a crankcase (not shown) of the engine 10 to the air induction pipe 12 at a position downstream of the throttle valve 14 and a PCV control valve 72 provided at an intermediate position along the length of the PCV pipe 70, whereby blow-by gas which leaks from the interior of the cylinder into the crankcase is recirculated to the air induction pipe 12 via the PCV pipe 70 when the PCV control valve 72 is opened. Note that the PCV control valve 72 is mechanically opened by virtue of the negative pressure inside the air induction pipe 12.

Thus, in this embodiment, the purge passage 38, the by-pass passage 44, the negative pressure induction pipe 56, the EGR pipe 64 and the PCV pipe 70 are connected to the air induction pipe 12 at the positions downstream of the throttle valve 14. Air (including burned gases and evaporative fuel) caused to flow into the air induction pipe 12 through the purge passage 38, the negative pressure induction pipe 56, the EGR pipe 64 and the PCV pipe 70 among those passages and pipes for supply to the engine 10 is referred to as secondary air.

To continue to describe by reference to FIG. 1, a hot wire type air flow meter 76 is provided on the upstream side of the throttle valve 14 in the air induction pipe 12 to output a signal indicating the volume Gair of induction air which passes the throttle valve 14 and the by-pass passage 44 to be supplied to the engine 10.

On the other hand, an absolute pressure sensor 78 and an induction air temperature sensor 80 are installed on the air induction pipe 12 at positions downstream of the throttle valve 14 or, more specifically, at positions downstream of the connecting positions where the purge passage 38, the by-pass passage 44, the negative pressure induction pipe 56, the ECR pipe 64 and the PCV pipe 70 are connected to the air induction pipe 12, and the absolute pressure sensor 78 and the induction air temperature sensor 80 output electric signals indicating an air induction pipe internal absolute pressure (engine load) PBA and an induction air temperature TA, respectively. In addition, a coolant temperature sensor 82 is mounted on a coolant passage in a cylinder block of the engine 10 so as to output a signal corresponding to an engine coolant temperature.

A cylinder determination sensor 84 is mounted in the vicinity of a camshaft or a crankshaft (both not shown) to output a cylinder determination signal CYL for a specific cylinder (for example, Cylinder No. 1) at a predetermined crank angle position or crankshaft position, and a TDC sensor 86 and a crank angle sensor or crankshaft position sensor 88 are also mounted to output a TDC signal at a predetermined crankshaft position associated with the TDC position of each piston and a CRK signal at a crankshaft position (for example, 30 degrees) having a shorter period than the TDC signal, respectively.

In addition, a linear-air-fuel ratio (LAF) sensor 90 is provided on the exhaust pipe 60 at a position upstream of the catalytic converter 62 to generate an output proportional to the density of oxygen in exhaust gases in a range extending from lean to rich conditions.

A vehicle speed sensor 92 is disposed in the vicinity of a drive shaft (not shown) of the vehicle to output a signal at a predetermined number of rotations of the drive shaft. In addition, an atmospheric pressure sensor 94 is provided at an appropriate location on the vehicle to output a signal corresponding to the pressure PA of the atmosphere of the location where the vehicle is situated.

Outputs from the respective sensors that have been described above are inputted into an ECU (an electronic control unit) 98.

The ECU 98 is made up of a microcomputer and includes a CPU 98a for implementing controlling operations, a ROM 98b which stores therein controlling operations programs and various types of data (tables or the like), a RAM 98c which temporarily stores the results of controlling operations implemented by the CPU 98a, an input circuit 98d, an output circuit 98 and a counter (not shown).

Outputs from the respective sensors are inputted into the input circuit 98d of the ECU 98. The input circuit 98d shapes the waveform of an inputted signal so as to modify the voltage level to a predetermined level and converts an analog signal value to a digital signal value. The CPU 98a counts a CRK signal outputted from the crankshaft position sensor 88 by the counter so as to detect an engine rotational speed NE and also counts a signal outputted from the vehicle speed sensor 92 by the counter so as to detect a vehicle speed VP indicating the running speed of the vehicle.

The CPU 98a implements controlling operations according to outputs from the respective sensors which are so inputted thereinto and the programs stored in the ROM 98b and then outputs driving signals to the injector 24, the respective control valves 40, 46, 66, and an ignition device (not shown).

Next, the operation of the internal combustion engine induction air volume calculating apparatus according to the embodiment of the invention will be described.

Figure 2:
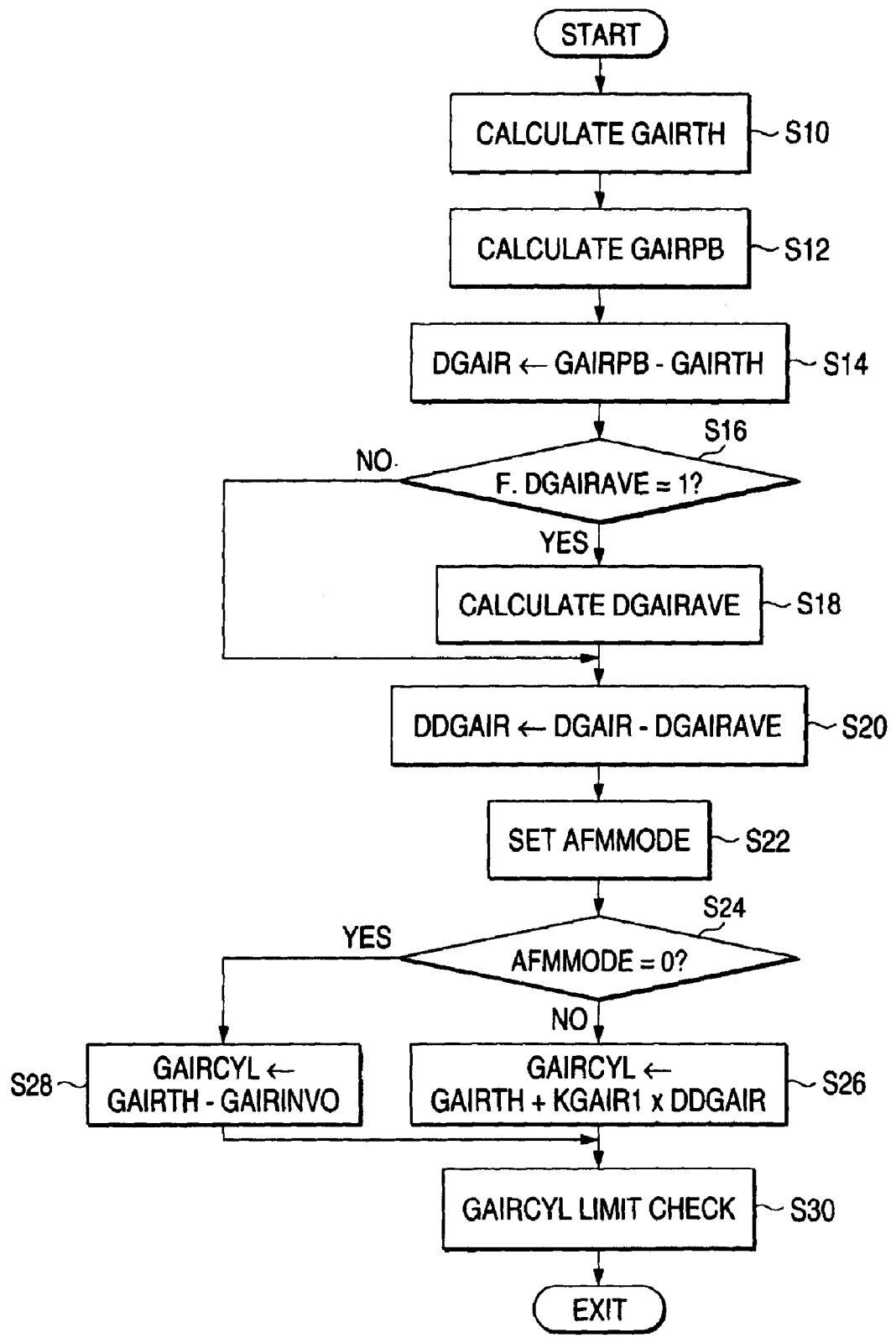
FIG. 2 is a flowchart illustrating an operation for calculating an induction air volume, among operations by an ECU of the apparatus.

FIG. 2 is a flowchart illustrating the operation of the apparatus according to the embodiment, or, more specifically, a procedure for calculating an induction air volume by the ECU 98. A program so illustrated is designed to be implemented every time a predetermined crankshaft position is reached.

To start the description, firstly, in step S10, an induction air volume GAIRTH that is supplied to the cylinder of the engine 10 is calculated based on an induction air volume Gair detected by the air flow meter 76. To be specific, a value obtained by multiplying a mean value of the time series data (from the latest value (the current value) to values stored a predetermined number of cycles back) of the induction air volume Gair stored in a ring buffer, which is not shown, by a correction coefficient which is set according to the induction air temperature TA and the atmospheric pressure PA or a value which is corrected according to the air density is made to be the induction air volume GAIRTH.

Following this, advance to step S12, where an induction air volume GAIRPB that is to be supplied to the cylinder of the engine 10 is calculated based on an air induction pipe internal absolute pressure PBA detected by the absolute pressure sensor 78. To be specific, using the mean value of the time series data (from the latest value (the current value) to the values stored the predetermined number of cycles back) of the air induction pipe internal absolute pressure PBA stored in the ring buffer, not shown, and the induction air temperature TA, an induction air volume GAIRPB is calculated according to the equation of state for gas. Hereinafter, this GAIRPB is referred to as a "second induction air volume."

Next, advance to step S14, where subtract the first induction air volume GAIRTH from the second induction air volume GAIRPB to obtain a value, which is then made to be a deviation DGAIR.

Here, as has been described before, since the air flow meter 76 is disposed upstream of the throttle valve 14, whereas the respective passages (or pipes) for supplying secondary air are disposed downstream of the throttle valve 14, secondary air is not included in the first induction air volume GAIRTH.

On the contrary, since the absolute pressure sensor 78 is disposed further downstream of the respective passages (or pipes) for supplying secondary air, secondary air amount is included in the second induction air volume GAIRPB, and there is a deviation in accordance with secondary air amount between the first induction air volume GAIRTH and the second induction air volume GAIRTH. Namely, in step S14, the deviation DGAIR is calculated.

Next, move to step S16, where whether or not the bit of a flag F. DGAIRAVE is set to 1 is determined. The flag F. DGAIRAVE is a flag indicating whether or not a mean value DGAIRAVE of the deviation DGAIR is calculated, and when the bit (an initial value 0) thereof is set to 1, it means that the calculation of the mean value DGAIRAVE is permitted. Note that a setting process for the bit of this flag F. DGAIRAVE will be described in detail later on.

If positive in step S16, or if the calculation of the mean value DGAIRAVE is permitted, then, advance to step S18.

In step S18, a weighted mean value of the deviation DGAIR is calculated according to the following equation (1), and the weighted mean value so calculated is made to take the place of the mean value DGAIRAVE (or the mean value DGAIRAVE is updated by the weighted mean value so calculated).

$$DGAIRAVE(n)=C \times DGAIR+(1-C) \times DGAIRAVE\ (n-1) \quad \text{Equation (1)}$$

In the equation (1) above, DGAIRAVE(n) is the current value (the current sample value in a discrete system) of the mean value DGAIRAVE, and DGAIRAVE (n−1) is the previous value (the previous sample value). In addition, C is a weight coefficient, and different values are used according to a difference between the current value and the previous value of the air induction pipe internal absolute pressure PBA or depending on whether the air induction pipe internal absolute pressure PBA is increasing or decreasing. Note that if negative in step S16, or if the calculation of a mean value DGAIRAVE is not permitted, then skip step S18.

Then, advance to step S20, where subtract the mean value DGAIRAVE from the deviation DGAIR to obtain a value, which is made to constitute a difference DDGAIR, and thereafter, advance to step S22, where a correction mode AFMMODE is set based on the difference DDGAIR so calculated.

Figure 3:
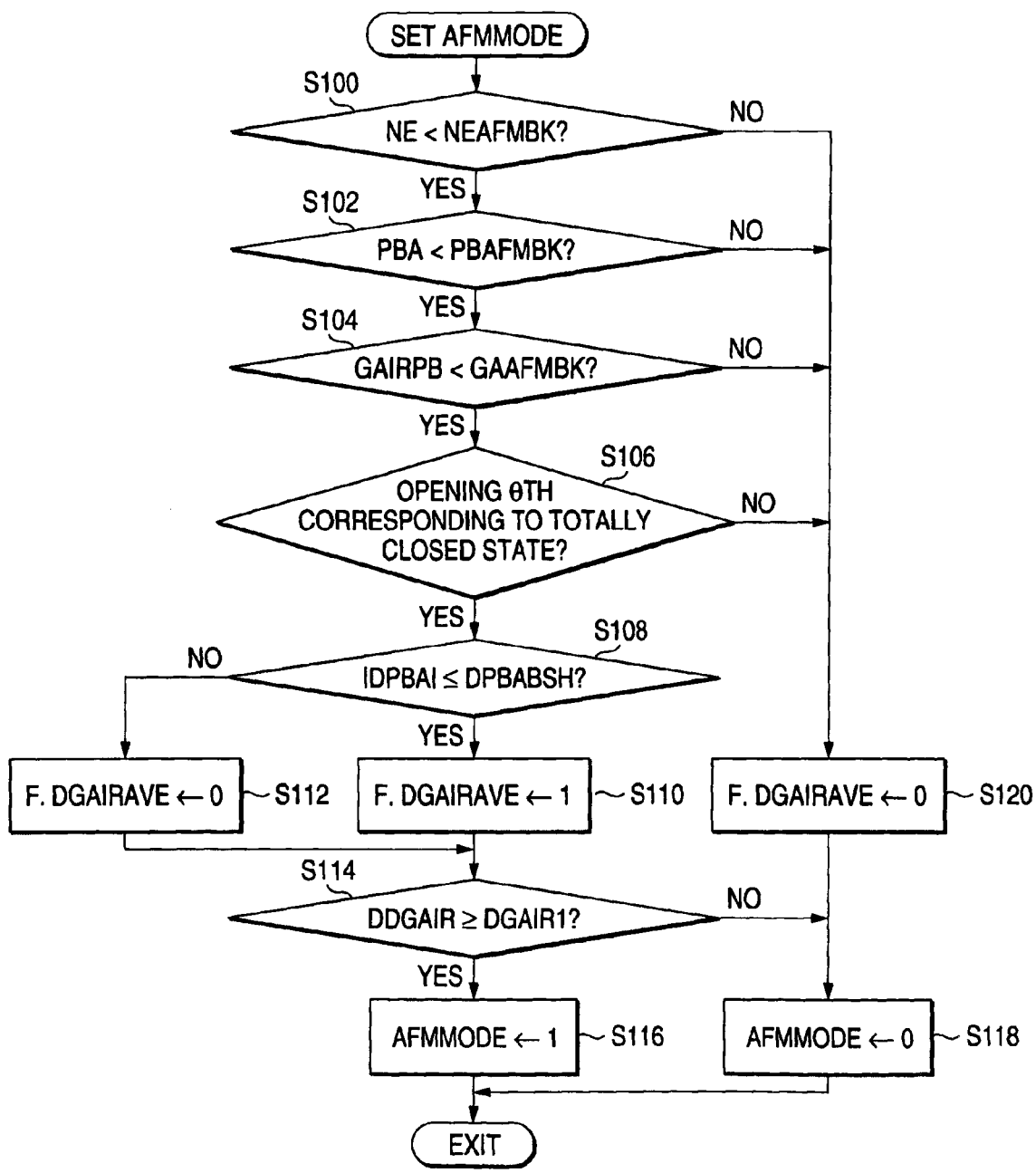
FIG. 3 is a subroutine flowchart in the flowchart in FIG. 2, which illustrates a correction mode setting operation.

FIG. 3 is a subroutine flowchart illustrating a setting procedure for the correction mode AFMMODE.

Referring to the flowchart shown in FIG. 3, the setting procedure for the correction mode AFMMODE will be described. Firstly, in step S100, whether or not a detected engine rotational speed NE is smaller than a predetermined value NEAFMBK (for example, 800 rpm) is determined. If positive in step S100, then advance to step S102, whether or not the detected air induction pipe internal absolute pressure PBA is smaller than a predetermined value PBAFMBK is determined, or whether or not the load of the engine 10 is light is determined.

If positive in step S102, then, move to step S104, where whether or not the second induction air volume GAIRPB calculated based on the air induction pipe internal absolute pressure PBA is smaller than a predetermined value GAAFMBK is determined. If positive in step S104, then, move to step S106, where whether or not the throttle opening θTH is such as to correspond to the totally-closed state (or whether or not the throttle opening θTH is equal to or smaller than a predetermined small opening) is determined.

If positive in step S106, then, advance to step S108, where whether or not the absolute value of the difference DPBA between the current value and the previous value of the air induction pipe internal absolute pressure PBA is equal to or smaller than a predetermined value DPBABSH or whether or not the load fluctuation of the engine 10 is small is determined.

If positive in step S108, or if totally positive from S100 to S108 and hence it is determined that the engine 10 is in the steady running condition, or, more specifically speaking, if it is determined that the engine 10 is idling, then, advance to step S110, where the bit of the flag F. DGAIRAVE is set to 1.

As has been described above, since the flag F. DGAIRAVE indicates that the calculation of the mean value DGAIRAVE is permitted when the bit thereof is set to 1, the mean value DGAIRAVE is understood to be calculated (updated) when the engine 10 is in the steady running condition, or, specifically speaking, when the engine 10 is idling. Namely, the mean value DGAIRAVE means a mean value of the deviation DGAIR between the first induction air volume GAIRTH and the second induction air volume GAIRPB when the engine 10 is idling.

On the other hand, if negative in step S108, or, specifically speaking, when the idle speed cannot be steady for some reason or when the engine is being decelerated (or in the transitional condition) immediately the throttle valve 14 is determined to be totally closed, then, advance to step S112, where the bit of the flag F. DGAIRAVE is reset to 0. Namely, the mean value DGAIRAVE is not calculated (or updated).

Then, advance to step S114, where whether or not the difference DDGAIR is larger than a predetermined value DGAIR1 is determined. To be more specific, whether or not the deviation DGAIR between the first induction air volume GAIRTH and the second induction air volume GAIRPB is being generated to exceed the predetermined value DGAIR1 over the mean value DGAIRAVE in the steady running condition is determined.

If positive in step S114, or if the deviation DGAIR between the first induction air volume GAIRTH and the second induction air volume GAIRPB varies so largely that secondary air is considered to flow into the air induction pipe 12, then, advance to step S116, where the correction mode AFMMODE is made to be 1. When the correction mode AFMMODE is 1, it follows that the correction of the first induction air volume GAIRTH is implemented.

On the other hand, if negative in step S114, then, advance to step S118, where the correction mode AFMMODE is made to be 0. When the correction mode AFMMODE is 0, it follows that the correction of the first induction air volume GAIRTH is not implemented.

In addition, if negative in any of steps S100 to S106, and hence, it is determined that the engine 10 is not in the steady running condition, then, advance to step S120, the bit of the flag F. DGAIRAVE is reset to 0, and thereafter, advance to step S118, where the correction mode AFMMODE is made to be 0.

Returning to the description of the flowchart shown in FIG. 2, then, advance to step S24, and whether or not the correction mode AFMMODE is 0 is determined.

If negative in step S24, then, advance to step S26, add to the first induction air volume GAIRTH a value obtained by multiplying the difference DDGAIR by a coefficient KGIR1 so as to obtain a value, which is then made to be a final induction air volume GAIRCYL. Namely, a value obtained by correcting the first induction air volume based on the difference DDGIR is made to be an induction air volume that is finally supplied to the cylinder of the engine 10 or the induction air volume GAIRCYL which contains the secondary air volume.

On the other hand, if positive in step S24, then, advance to S28, where a value obtained by subtracting a delay correction value GAIRINV0 from the first induction air volume GAIRTH is made to be a final induction air volume GAIRCYL. Note that the delay correction value is a value which is set according to the volume of an intake manifold and an induction air temperature TA and is a correction value for correcting a delay that would take place when induction air detected by the air flow meter 76 reaches the cylinder of the engine 10.

Finally, advance to step S30, where the limit of the induction air volume GAIRCYL after correction is checked, and end the operation. Note that an upper limit of the induction air volume GAIRCYL is calculated based on the volume of the cylinder, induction air temperature TA and atmospheric pressure PA.

Thus, whether or not secondary air is supplied to the engine 10 is determined based on a detected value of the air flow meter 76 and a detected value of the absolute pressure sensor 78. To be more specific, the deviation DGAIR between the first induction air volume GAIRTH calculated based on a detected value (Gair) of the air flow meter 76 and the second induction air volume GAIRPB calculated based on a detected value (PBA) of the absolute pressure sensor 78 is calculated, and the mean value DGAIRAVE of the deviation DGAIR is calculated. Then, when the difference DDGAIR between the deviation DGAIR and its mean value DGAIRAVE is larger than the predetermined value DGAIL1, secondary air is determined to be supplied to the engine 10, and the first induction air volume GAIRTH is corrected. Thus, secondary air that cannot be detected by the air flow meter 76 can be detected more accurately, thereby making it possible to calculate the induction air volume GAIRCYL which contains the secondary air volume with good accuracy.

In particular, since the deviation DGAIR between the first induction air volume GAIRTH and the second induction air volume GAIRPB is calculated, and the mean value DGAIRAVE of the deviation DGAIR is calculated, whereby whether or not secondary air is supplied to the engine 10 is determined by comparing the difference DDGAIR between the deviation DGAIR and its mean value DGAIRAVE with the predetermined value DGAIR1 (the correction mode AFMMODE is set), the existence of supplied secondary air can be determined with better accuracy.

In addition, since the correction volume for correcting the first induction air volume GAIRTH is calculated based on the deviation DGAIR between the first induction air volume GAIRTH and the second induction air volume DGAIRPB, or, more specifically speaking, the correction volume (the value obtained by multiplying the deviation DDGAIR by the coefficient KGAIR) for correcting the first induction air volume GAIRTH is calculated based on the difference DDGAIR between the deviation DGAIR and its mean value DQAIRAVE, the induction air volume GAIRCYL which contains secondary air volume can be calculated with better accuracy.

Furthermore, since the mean value DQAIRAVE is calculated in the steady running condition where the running condition of the engine 10 varies little, or, more particularly, when the engine is idling, in other words, in running conditions other than the transitional running condition where the induction air volume fluctuates largely, the mean value DQAIRAVE used for determination of the existence of supplied secondary air can be calculated properly.

To describe in detail the reason for this, a delay is caused before the induction air detected by the air flow meter 76 reaches the absolute pressure sensor 78. Due to this, in the transitional running condition where the induction air volume fluctuates largely, a deviation is produced between the first induction air volume GAIRTH and the second induction air volume GAIRPB which were calculated at the same time (when the program was executed, irrespective of the existence of secondary air. Consequently, by arranging for the mean value DQAIRAVE used for determination of the existence of secondary air not to be calculated (or updated) when the engine 10 is in the transitional running condition, the value of the mean value DQAIRAVE can be maintained to an appropriate value, thereby making it possible to detect the secondary air volume more accurately.

In addition, from the same reason, since an erroneous determination of the supply of secondary air to the engine 10 is made easily and the effect of the fluctuation in induction air volume attributed to the secondary air does not become remarkable in the transitional running condition where the induction air volume fluctuates largely, the determination of the existence of secondary air and correction of the first induction air volume GAIRTH are not implemented in the transitional running condition. In other words, the existence of secondary air is determined and the first induction air volume GAIRTH is corrected when the engine 10 is in the steady running condition where the induction air volume fluctuates little or is idling, thereby making it possible to suppress the fluctuations in air-fuel ratios and engine rotational speed that are attributed to secondary air.

Note that the CPU 98a determines a fuel injection volume based on the induction air volume GAIRCYL that has been calculated as described above and controls such that the engine rotational speed NE reaches a target rotational speed.

Thus, according to the embodiment of the invention, there is provided the internal combustion engine induction air volume calculating apparatus for calculating the volume GAIRCYL of induction air supplied to the internal combustion engine (the engine) 10 via the air induction pipe 12, including the air flow meter 76 for detecting the volume (the first induction air volume GAIRTH) of induction air which passes the throttle valve 14 disposed in the air induction pipe 12, the air induction pipe internal pressure sensor (the absolute pressure sensor) 78 for detecting the internal pressure (the internal absolute pressure) of the air induction pipe 12, the determination unit (ECU 98, steps S10 to S22, steps S100 to S120) for determining whether or not induction air (secondary air) other than the induction air volume so detected is supplied to the internal combustion engine based on the detected induction air volume and air induction pipe internal pressure, and the correction unit (ECU 98, steps S24 to S26) for correcting the detected induction air volume when it is determined that induction air other than the induction air volume so detected is supplied to the internal combustion engine.

In addition, the correction unit calculates (step S26) the correction volume (the value obtained by multiplying the deviation DDGAIR by the coefficient KGAIR1) for correcting the detected induction air volume based on the detected induction air volume and air induction pipe internal pressure.

Additionally, the determination unit determines (step S22, steps S100 to S120) whether or not induction air other than the detected induction air volume is supplied to the internal combustion engine at least either when the running condition of the internal combustion engine varies little (the steady running condition) or when the internal combustion engine is idling.

Furthermore, according to the embodiment of the invention, there is provided the internal combustion engine induction air volume calculator for calculating the volume GAIRCYL of induction air supplied to the internal combustion engine (the engine) 10 via the air induction pipe 12, including the air flow meter 76 for detecting the volume Gair of induction air which passes the throttle valve 14 disposed in the air induction pipe 12, the first induction air volume calculator (ECU 98, step S10) for calculating the first induction air volume GAIRTH which is supplied to the internal combustion engine based on the induction air volume Gair so detected, the air induction pipe internal pressure sensor (the absolute pressure sensor) 78 for detecting the internal pressure (the absolute pressure) of the air induction pipe 12, the second induction air volume calculator (ECU 98, step S12) for calculating the second induction air volume GAIRPB which is supplied to the internal combustion engine based on the air induction pipe internal pressure PBA so detected, the deviation calculator (ECU 98, step S14) for calculating the deviation DGAIR between the detected first induction air volume GAIRTH and second induction air volume GAIRPB, the determination unit (ECU 98, steps S114 to S118) for determining whether or not induction air (secondary air) other than the first induction air volume GAIRTH is supplied to the internal combustion engine based on the deviation DGAIR (more particularly, the difference DDGAIR between the deviation DGAIR and its mean value DGAIRAVE) so calculated, and the correction unit (ECU 98, step S24, step S26) for correcting the first induction air volume GAIRTH when it is determined that induction air (secondary air) other than the first induction air volume GAIRTH is supplied to the internal combustion engine.

In addition, the correction unit calculates (step S26) the correction volume (the value obtained by multiplying the difference DDGAIR by the coefficient KGAIR1) for correcting the first induction air volume GAIRTH based on the deviation DGAIR.

Furthermore, the induction air volume calculating apparatus further includes the mean value calculator (ECU 98, step S18) for calculating the mean value DGAIRAVE of the deviation DGAIR, and the difference calculator (ECU 98, step S30) for calculating the difference DDGAIR between the deviation DGAIR and the mean value DGAIRAVE so calculated, wherein the determination unit determines whether or not induction air other than the first induction air volume GAIRTH is supplied to the internal combustion engine based on the difference DDGAIR so calculated.

In addition, the mean value calculator calculates (step S16, step S18, steps S100 to S110) the mean value DGAIRAVE at least either when the running condition of the internal combustion engine varies little or when the internal combustion engine is idling.

Additionally, the correction unit calculates (step S26) the correction volume (the value obtained by multiplying the difference DDGAIR by the coefficient KGAIR1) for correcting the first induction air volume GAIRTH based on the difference DDGAIR.

In addition, the determination unit determines (steps S100 to S120) whether or not induction air other than the first induction air volume GAIRTH is supplied to the internal combustion engine at least either when the running condition of the internal combustion engine varies little or when the internal combustion engine is idling.

Note that while, in the description of the mode for carrying out the invention, the invention has been described with the embodiment in which the engine rotational speed NE is controlled by mechanically connecting the accelerator pedal 18 with the throttle valve 14, providing the by-pass passage which by-passes the throttle valve 14, and adjusting the by-pass air volume via the by-pass control valve 46, the invention may be applied to a DBW (Drive by Wire) system where the mechanical connection between the accelerator pedal and the throttle valve is removed.

In addition, while the hot wire type air flow meter 76 is used, the invention is not limited thereto, and Karman Vortex-type and vane-type air flow meters may be used.

Moreover, the invention may be applied to an idle speed controlling apparatus for a marine engine for propelling a boat such as an outboard engine.

According to the first aspect of the invention, the volume of induction air that passes the throttle valve is detected by the air flow meter, and the internal pressure of the air induction pipe is detected by the air induction pipe internal pressure sensor. Based on the induction air volume and air induction pipe internal pressure which were so detected, whether or not induction air other than the induction air volume (the volume of induction air that passes the throttle valve) detected by the air flow meter or secondary air is supplied to the internal combustion engine is determined, and when it is determined that there exists secondary air that is supplied to the internal combustion engine, then the induction air volume detected by the air flow meter is designed to be corrected. According to the construction, the secondary air that cannot be detected by the air flow meter can be detected accurately, whereby the volume of induction air that is supplied to the internal combustion engine can be calculated with good accuracy. In addition, since the volume of induction air supplied to the internal combustion engine is calculated based on values detected by the air flow meter and the air induction pipe internal pressure sensor, the necessity for switches for sensing the existence of supplied secondary air can be obviated.

According to the second aspect of the invention, since the correction volume for correcting the induction air volume that was detected by the air flow meter is calculated based on the detected induction air volume and air induction pipe internal pressure, the volume of induction air supplied to the internal combustion engine can be calculated more accurately and quickly.

According to the third aspect of the invention, since whether or not secondary air is supplied to the internal combustion engine is determined at least either when the running condition of the internal combustion engine varies little or when the internal combustion engine is idling, or in running conditions of the internal combustion engine other than the transitional running condition thereof where the effect of fluctuations in induction air volume attributed to secondary air becomes remarkable, fluctuations in air-fuel ratios and engine speed can be suppressed effectively.

According to the fourth aspect of the invention, the deviation between the first induction air volume (the volume of induction air that passes the throttle vale) which is calculated based on the detected value of the air flow meter and the second induction air volume which is calculated based on the detected value of the air induction pipe internal pressure sensor is calculated, and based on the calculated deviation, whether or not induction air other than the first induction air volume or secondary air is supplied to the internal combustion engine is determined. Then, when it is determined that there exists secondary air that is supplied to the internal combustion engine, the first induction air volume is designed to be corrected. Thus, according to the construction, the volume of secondary air that cannot be detected by the air flow meter can be detected accurately, whereby the volume of induction air supplied to the internal combustion engine can be calculated with good accuracy. In addition, since the volume of induction air supplied to the internal combustion engine is calculated based on values detected by the air flow meter and the air induction pipe internal pressure sensor, the necessity for switches for detecting the existence of supplied secondary air can be obviated.

According to the fifth aspect of the invention, since the correction volume for correcting the first induction air volume is calculated based on the deviation between the first induction air volume and the second induction air volume, the volume of induction air supplied to the internal combustion air can be calculated with better accuracy.

According to the sixth aspect of the invention, since whether or not secondary air is supplied to the internal combustion engine is determined based on the difference between the deviation between the first induction air volume and the second induction air volume and the mean value, the existence of supplied secondary air can be determined with better accuracy.

According to the seventh aspect of the invention, since the mean value is calculated at least either when the running condition of the internal combustion engine varies little or when the internal combustion engine is idling, or in running conditions of the internal combustion engine other than the transitional running condition thereof where there occur large fluctuations in induction air volume, the mean value used for determination of the existence of secondary air can be calculated properly, thereby making it possible to determine the existence of supplied secondary air with better accuracy.

According to the eighth aspect of the invention, since the correction volume for correcting the first induction air volume is calculated based on the difference between the deviation between the first induction air volume and the second induction air volume and the mean value thereof, the volume of induction air supplied to the internal combustion engine can be calculated with better accuracy.

According to the ninth aspect of the invention, since whether or not secondary air is supplied to the internal combustion engine is determined at least either when the running condition of the internal combustion engine varies little or when the internal combustion engine is idling, or in running conditions of the internal combustion engine other than the transitional running condition thereof where the effect of fluctuations in induction air volume attributed to secondary air becomes remarkable, fluctuations in air-fuel ratios and engine speed can be suppressed effectively.

What is claimed is:

1. An internal combustion engine induction air volume calculating apparatus for calculating the volume of induction air supplied to an internal combustion engine via an air induction pipe, the apparatus comprising:
   a. an air flow meter for detecting the volume of induction air which passes a throttle valve disposed in the air induction pipe;
   b. an air induction pipe internal pressure sensor for detecting the internal pressure of the air induction pipe;
   c. determination unit for determining whether or not induction air other than the induction air volume so detected is supplied to the internal combustion engine based on the detected induction air volume and air induction pipe internal pressure; and
   d. correction unit for correcting the detected induction air volume when it is determined that induction air other than the induction air volume so detected is supplied to the internal combustion engine.

2. The internal combustion engine induction air volume calculating apparatus as set forth in claim 1, wherein
   the correction unit calculates a correction volume for correcting the detected induction air volume based on the detected induction air volume and air induction pipe internal pressure.

3. The internal combustion engine induction air volume calculating apparatus as set forth in claim 1, wherein
   the determination unit determines whether or not induction air other than the detected induction air volume is supplied to the internal combustion engine at least either when the running condition of the internal combustion engine varies little or when the internal combustion engine is idling.

4. An internal combustion engine induction air volume calculating apparatus for calculating the volume of induction air supplied to an internal combustion engine via an air induction pipe, the apparatus comprising:
   a. an air flow meter for detecting the volume of induction air which passes a throttle valve disposed in the air induction pipe;
   b. first induction air volume calculator for calculating a first induction air volume which is supplied to the internal combustion engine based on the induction air volume so detected;
   c. an air induction pipe internal pressure sensor for detecting the internal pressure of the air induction pipe;
   d. second induction air volume calculator for calculating a second induction air volume which is supplied to the internal combustion engine based on the air induction pipe internal pressure so detected;
   e. deviation calculator for calculating a deviation between the detected first induction air volume and second induction air volume;
   f. determination unit for determining whether or not induction air other than the first induction air volume is supplied to the internal combustion engine based on the deviation so calculated; and
   g. correction unit for correcting the first induction air volume when it is determined that induction air other than the first induction air volume is supplied to the internal combustion engine.

5. The internal combustion engine induction air volume calculator as set forth in claim 4, wherein
   the correction unit calculates a correction volume for correcting the first induction air volume based on the deviation.

6. The internal combustion engine induction air volume calculating apparatus as set forth in claim 4, further comprising:
   h. mean value calculator for calculating a mean value of the deviation; and
   i. difference calculator for calculating a difference between the deviation and the mean value so calculated, wherein
   the determination unit determines whether or not induction air other than the first induction air volume is supplied to the internal combustion engine based on the difference so calculated.

7. The internal combustion engine induction air volume calculating apparatus as set forth in claim 6, wherein
   the mean value calculator calculates the mean value at least either when the running condition of the internal combustion engine varies little or when the internal combustion engine is idling.

8. The internal combustion engine induction air volume calculating apparatus as set forth in claim 6, wherein
   the correction unit calculates a correction volume for correcting the first induction air volume based on the difference.

9. The internal combustion engine induction air volume calculating apparatus as set forth in claim 4, wherein
   the determination unit determines whether or not induction air other than the first induction air volume is supplied to the internal combustion engine at least either when the running condition of the internal combustion engine varies little or when the internal combustion engine is idling.

10. An internal combustion engine induction air volume calculating method for calculating the volume of induction air supplied to an internal combustion engine via an air induction pipe, the method comprising the steps of:
a. detecting the volume of induction air which passes a throttle valve disposed in the air induction pipe;
b. detecting the internal pressure of the air induction pipe;
c. determining whether or not induction air other than the induction air volume so detected is supplied to the internal combustion engine based on the detected induction air volume and air induction pipe internal pressure; and
d. correcting the detected induction air volume when it is determined that induction air other than the induction air volume so detected is supplied to the internal combustion engine.

11. The internal combustion engine induction air volume calculating method as set forth in claim 10, wherein
the correction step calculates a correction volume for correcting the detected induction air volume based on the detected induction air volume and air induction pipe internal pressure.

12. The internal combustion engine induction air volume calculating method as set forth in claim 10, wherein
the determination step determines whether or not induction air other than the detected induction air volume is supplied to the internal combustion engine at least either when the running condition of the internal combustion engine varies little or when the internal combustion engine is idling.

13. An internal combustion engine induction air volume calculating method for calculating the volume of induction air supplied to an internal combustion engine via an air induction pipe, the method comprising the steps of:
a. detecting the volume of induction air which passes a throttle valve disposed in the air induction pipe;
b. calculating a first induction air volume which is supplied to the internal combustion engine based on the induction air volume so detected;
c. detecting the internal pressure of the air induction pipe;
d. calculating a second induction air volume which is supplied to the internal combustion engine based on the air induction pipe internal pressure so detected;
e. calculating a deviation between the detected first induction air volume and second induction air volume;
f. determining whether or not induction air other than the first induction air volume is supplied to the internal combustion engine based on the deviation so calculated; and
g. correcting the first induction air volume when it is determined that induction air other than the first induction air volume is supplied to the internal combustion engine.

14. The internal combustion engine induction air volume calculator as set forth in claim 13, wherein
the correction step calculates a correction volume for correcting the first induction air volume based on the deviation.

15. The internal combustion engine induction air volume calculating method as set forth in claim 13, further comprising the steps of:
h. calculating a mean value of the deviation; and
i. calculating a difference between the deviation and the mean value so calculated, wherein the determination step determines whether or not induction air other than the first induction air volume is supplied to the internal combustion engine based on the difference so calculated.

16. The internal combustion engine induction air volume calculating method as set forth in claim 15, wherein
the mean value calculating step calculates the mean value at least either when the running condition of the internal combustion engine varies little or when the internal combustion engine is idling.

17. The internal combustion engine induction air volume calculating method as set forth in claim 15, wherein
the correction step calculates a correction volume for correcting the first induction air volume based on the difference.

18. The internal combustion engine induction air volume calculating method as set forth in claim 13, wherein
the determination step determines whether or not induction air other than the first induction air volume is supplied to the internal combustion engine at least either when the running condition of the internal combustion engine varies little or when the internal combustion engine is idling.

19. A medium including a program for executing an internal combustion engine induction air volume calculating method for calculating the volume of induction air supplied to an internal combustion engine via an air induction pipe, the method comprising the steps of:
a. detecting the volume of induction air which passes a throttle valve disposed in the air induction pipe;
b. detecting the internal pressure of the air induction pipe;
c. determining whether or not induction air other than the induction air volume so detected is supplied to the internal combustion engine based on the detected induction air volume and air induction pipe internal pressure; and
d. correcting the detected induction air volume when it is determined that induction air other than the induction air volume so detected is supplied to the internal combustion engine.

20. The medium as set forth in claim 19, wherein
the correction step calculates a correction volume for correcting the detected induction air volume based on the detected induction air volume and air induction pipe internal pressure.

21. The medium as set forth in claim 19, wherein
the determination step determines whether or not induction air other than the detected induction air volume is supplied to the internal combustion engine at least either when the running condition of the internal combustion engine varies little or when the internal combustion engine is idling.

22. A medium including a program for executing an internal combustion engine induction air volume calculating method for calculating the volume of induction air supplied to an internal combustion engine via an air induction pipe, the method comprising:
a. detecting the volume of induction air which passes a throttle valve disposed in the air induction pipe;
b. calculating a first induction air volume which is supplied to the internal combustion engine based on the induction air volume so detected;
c. detecting the internal pressure of the air induction pipe;
d. calculating a second induction air volume which is supplied to the internal combustion engine based on the air induction pipe internal pressure so detected;

e. calculating a deviation between the detected first induction air volume and second induction air volume;

f. determining whether or not induction air other than the first induction air volume is supplied to the internal combustion engine based on the deviation so calculated; and g. correcting the first induction air volume when it is determined that induction air other than the first induction air volume is supplied to the internal combustion engine.

23. The medium as set forth in claim 22, wherein the correction step calculates a correction volume for correcting the first induction air volume based on the deviation.

24. The medium as set forth in claim 22, further comprising the steps of:

h. calculating a mean value of the deviation; and i. calculating a difference between the deviation and the mean value so calculated, wherein the determination step determines whether or not induction air other than the first induction air volume is supplied to the internal combustion engine based on the difference so calculated.

25. The medium as set forth in claim 24, wherein the mean value calculating step calculates the mean value at least either when the running condition of the internal combustion engine varies little or when the internal combustion engine is idling.

26. The medium as set forth in claim 24, wherein the correction step calculates a correction volume for correcting the first induction air volume based on the difference.

27. The medium as set forth in claim 22, wherein the determination step determines whether or not induction air other than the first induction air volume is supplied to the internal combustion engine at least either when the running condition of the internal combustion engine varies little or when the internal combustion engine is idling.

\* \* \* \* \*